United States Patent [19]
Riedner

[11] 3,872,979
[45] Mar. 25, 1975

[54] ORDER PICKER BACKSTOP WITH OFFLOAD FEATURE IN EITHER DIRECTION

[75] Inventor: William E. Riedner, Battle Creek, Mich.

[73] Assignee: Clark Equipment Company, Buchanan, Mich.

[22] Filed: Aug. 18, 1972

[21] Appl. No.: 281,889

[52] U.S. Cl............................ 214/1 BB, 214/730
[51] Int. Cl................................................ B66f 9/14
[58] Field of Search............ 214/16, 4 A, 730, 6 S; 271/59, 61, 89, DIG. 4; 198/29

[56] References Cited
UNITED STATES PATENTS

| | | | |
|---|---|---|---|
| 3,047,169 | 7/1962 | Matson | 214/64.2 |
| 3,184,083 | 5/1965 | Chasar | 214/6 S |
| 3,323,661 | 6/1967 | Chasar | 214/16.4 A |
| 3,720,327 | 3/1973 | Snyder et al. | 214/16.4 A |

FOREIGN PATENTS OR APPLICATIONS

| | | | |
|---|---|---|---|
| 508,377 | 9/1930 | Germany | 293/84 |

Primary Examiner—Robert G. Sheridan
Assistant Examiner—Lawrence J. Oresky
Attorney, Agent, or Firm—Harry G. Thibault

[57] ABSTRACT

This is a storage system having a stacker which may be operated between two tiers of bins with capability to deposit and remove material from the bins in either tier. The stacker has a horizontally movable shuttle which carries the material in and out of the bins. Located normal to the platform of the shuttle and lying in a plane extending in the direction of movement of the material is a translationally movable stop which is the subject of present invention. This translationally movable stop is spring biased and acts as a firm locating vertically extending stop for the material placed on the shuttle but moves translationally and allows the material to move freely as the shuttle is extended or retracted to place material in the bin or remove it therefrom respectively.

1 Claim, 3 Drawing Figures

ORDER PICKER BACKSTOP WITH OFFLOAD FEATURE IN EITHER DIRECTION

BACKGROUND AND SUMMARY OF THE INVENTION

This invention relates to stackers for automatic storage equipment and more particularly to vertically extending stop mechanisms for locating material on the shuttle of said stackers and permitting the material to be moved in a horizontal plane with a minimum of interference. This invention relates to automatic storage systems of the type shown in U.S. Pat. No. 3,503,530 — Burch et al, issued Mar. 31, 1970, and to stackers for automatic storage systems of this type as shown in co-pending application Ser. No. 197,424 — Automatic Storage System Order Picker Cab Construction — Snyder et al, filed Nov. 10, 1971, now U.S. Pat. No. 3,720,327, issued Mar. 3, 1973.

The material stop or locating mechanism in the present invention includes a vertically extending plate which acts as a stop, resisting forces exerted normal to the plate, while being easily moved translationally by horizontal forces parallel to the plate.

Previous stops, while being very effective to limit movement in a direction normal to the stop, have not had the ability to automatically minimize the frictional contact with the stop as the material is moved in a direction parallel to the stop. When such stops are used on stackers or other devices having platforms carrying material in a direction parallel to the stop the stop mechanism by engaging the material frictionally may cause the material to move and thus become dislocated as the platform moves in a direction parallel to the stop. In the present invention this difficulty experienced with prior stops has been eliminated by an economical double hinge mechanism which allows the stop to move translationally if engaged by the material as it is moved in a direction parallel to the stop. This double hinge mechanism in the present invention in its normal stop position is spring biased in the fully extended position so that a rigid stopping force is exerted to movement in a direction normal to the stop member but allows the member to move translationally when horizontal forces are exerted in either direction.

It is, therefore, an object of the present invention to provide a stop mechanism for a stacker vehicle having a horizontally moving material handling device.

It is another object of the present invention to provide a translationally movable stop mechanism which is automatically retracted by the exertion of forces parallel to the stop element surface.

It is a further object of the present invention to provide a translationally movable stop mechanism spring biased to a position at the apex of its movement.

Other objects of the present invention will more fully appear from the following description mating connection with accompanying drawing and will be pointed out more particularly in the claims.

GENERAL DESCRIPTION

Referring to the FIGURES in the drawings.

Figure 1:
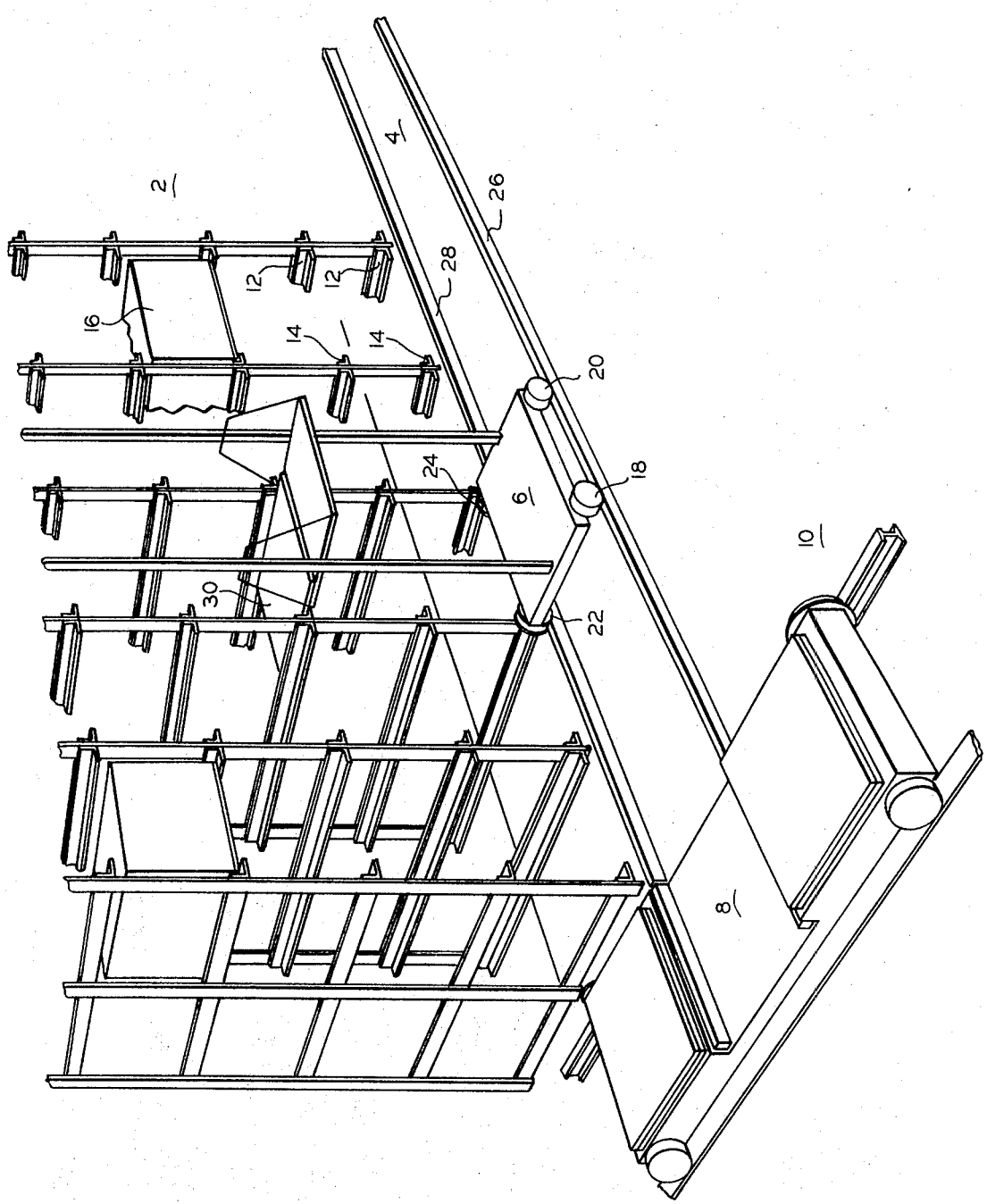
FIG. 1 is a schematic drawing showing the general arrangement of the material storage system of the type utilizing the present invention.

Referring more particularly to FIG. 1, 2 illustrate the bin arrangement for storing material mounted on pallets utilized in one embodiment of the present invention.

4 is the aisle between the bin structure 2 and the neighboring bin structure, while 6 illustrates a stacker which travels in the aisle 4. The stacker 6 is carried between the aisles by a transfer car 8, which travels on rails 10 extending transverse the aisles. The bins shown generally as 2 have a series of shelves or bin structures 12 and 14 suitably spaced to support the material 16 being stored therein.

Figure 2:
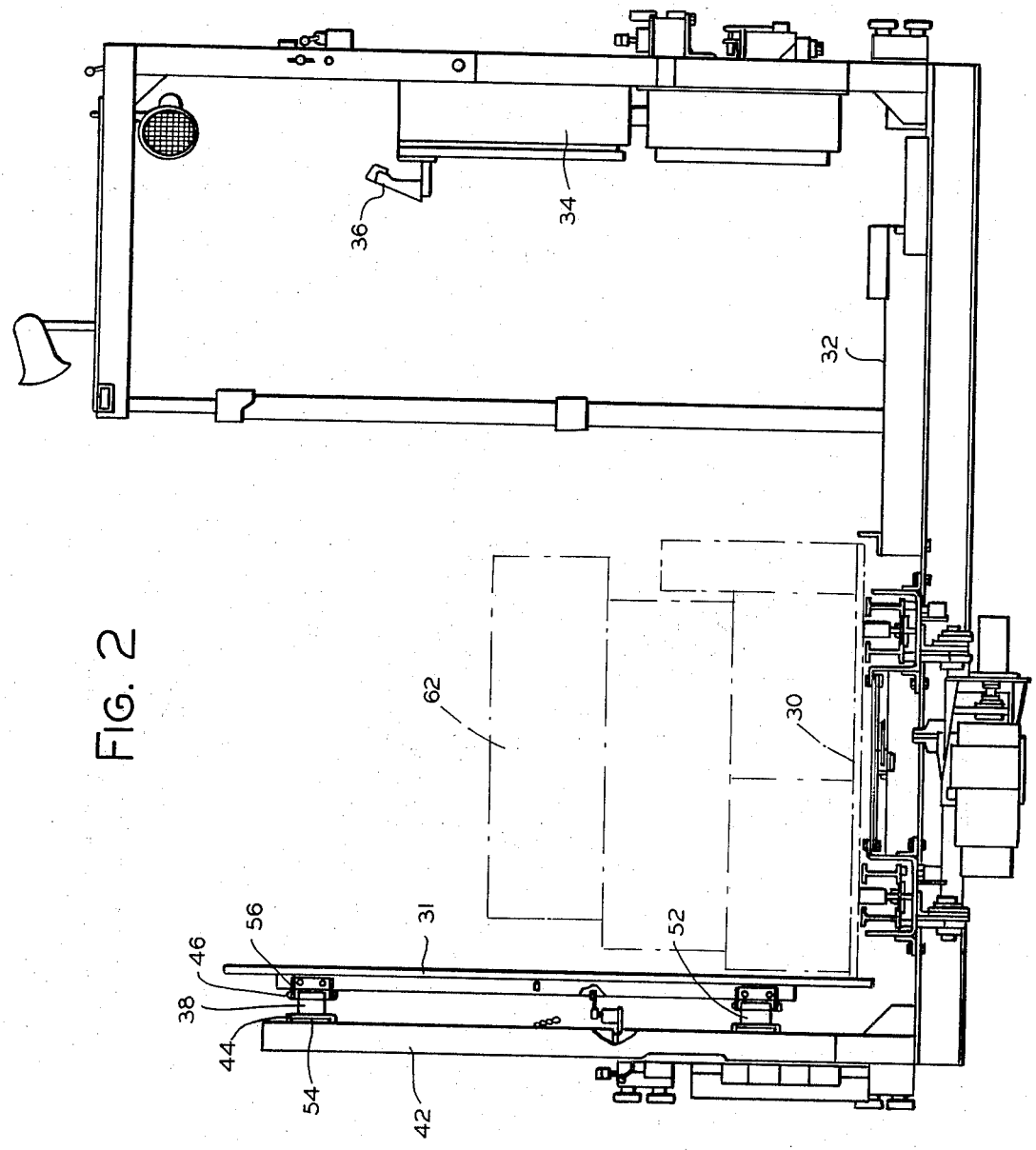
FIG. 2 is a vertical view of the operator platform including the material shuttle and the stop mechanism which is the subject of the present invention.

The stacker 6 is supported on wheels 18, 20, 22 and 24 which operates on the rails 26, and 28 in the aisle 4. The stacker vehicle 6 shown in this Figure only schematically carries an operator cab structure as shown in FIG. 2. This cab structure is generally the same as is shown in copending application Ser. No. 197,424, "Automatic Storage System Order Picker Cab Construction" — Snyder et al, filed Nov. 10, 1971.

Referring now to FIG. 2, the vertically movable operator platform carried by the stacker 6 is shown in greater detail. 30 is a load carrying pallet or may in fact be the load carrying platform itself used to deposit and retrieve the material 16 (shown in FIG. 1) to and from the bins of the storage system. 31 is the stop against which the material is located to assure the material being in the proper position for deposit in the selected storage bin. This stop 31 may have a flat surface extending both horizontally and vertically to the limiting dimension of the material load. 32 is the operator platform used in manual control of the stacker for individual order picking from the bins of stored material. The cabinet 34 contains electrical equipment which is operated by the manual control 36 when the stacker is controlled by an operator in the cab.

Figure 3:
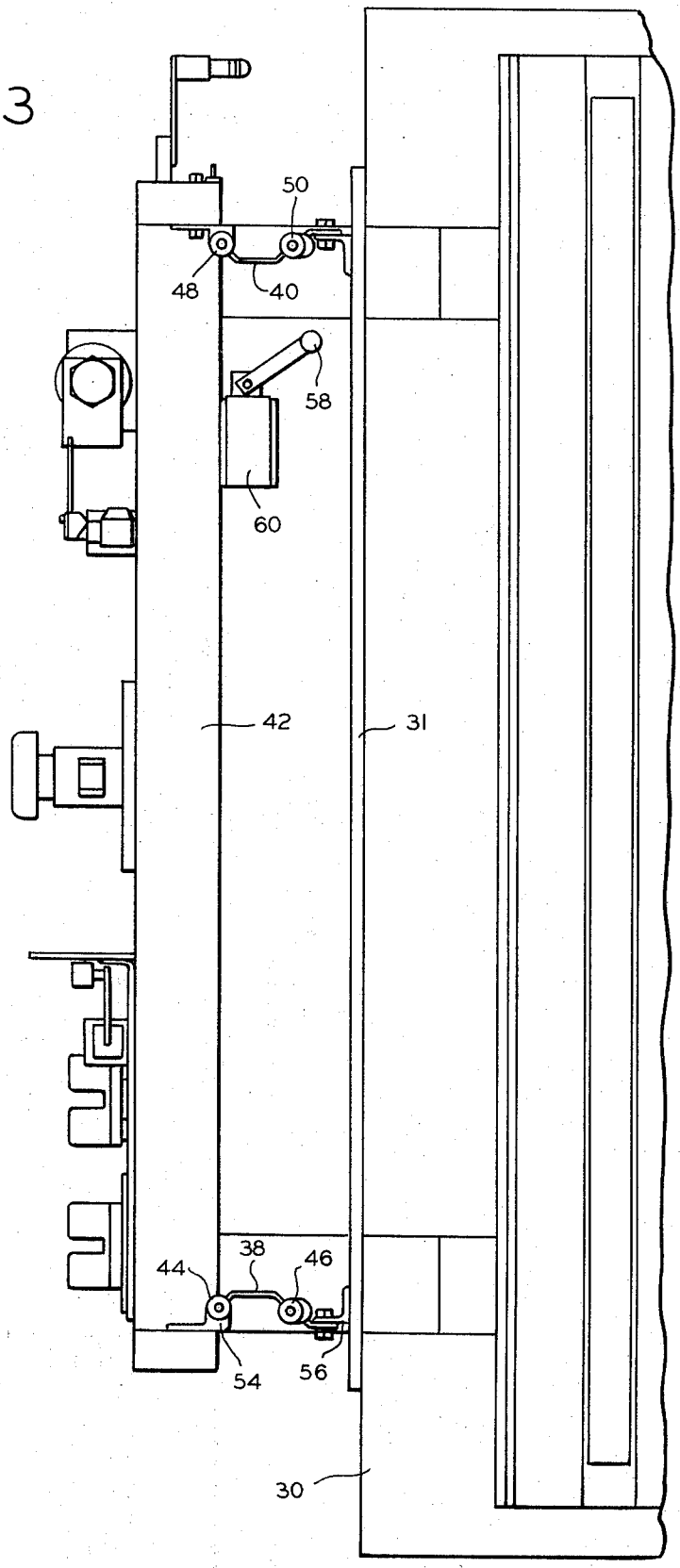
FIG. 3 is a horizontal view showing the stop element and its double hinged attachment permitting translational movement.

Referring now to FIG. 3 the stop mechanism is shown in greater detail in a horizontal view. In this FIGURE the material 30 is shown butting against the stop member 31. The stop member 31 is attached to the frame of the vertically movable stacker cab assembly 42 by means of pivotal linkages 38 and 40. The linkage member 38 is pivoted to the frame at 44 and to the stop member 31 by pivot 46. Likewise the link member 40 is pivoted to the frame by pivot 48 and to the stop member 31 by the pivot 50. The link members 38 and 40 are of equal length. Likewise the distance between the pivot 44 and 48 is equal to the distance between the pivot 46 and 50. It may thus be seen that if a line were drawn from the pivot 44 to the pivot 48, then to the pivot 50, thence to the pivot 46 and then back to the pivot 44 that these lines would always form a parallelogram and that when the stop 31 is in the position shown, this parallelogram would become a rectangle.

Stop Mechanism Description

The present invention is particularly related to the translationally movable material locating or stop mechanism of which a vertical view was shown in FIG. 2 and the horizontal view shown in FIG. 3. Referring more particularly to the structure shown in these two figures, 31 is the stop element and in the particular embodiment shown is a vertically displaced flat metal plate extending both vertically and horizontally to the maximum dimension of the load to be carried on the flat pallet 30. The stop plate 31 is supported on the rigid cab member 42 by means of four hinge links 38 and 40 horizontally displaced from each other and 52 and a fourth hinge link (not shown) horizontally displaced from each other. All four of these links are identical in dimension and in means of attachment and, therefore, only the attachment of the link 38 will be described in detail.

The link 38 is hinged at the point 44 to the rigid cab member 42 by means of a plate 54. 38 is hinged at the point 46 to the stop element 32 by means of the member 56. The pivot members 44 and 46 have spring biasing means therein of the common type which resiliently holds the stop member 31 in the position shown in FIGS. 2 and 3. Since the links 38, 40, 52 and the member not shown are all equal length, the stop element 31 moves translationally when a horizontal force is placed on the element 31 always remaining parallel to the member 42.

Since, as mentioned above, each of the pivot members 44, 46, 48, 50, etc. have spring biasing members located therein, the stop element 31 returns to the position shown in the drawings once the horizontal force exerted thereon is removed. However, should the force be such as to move the stop member 31 beyond the predetermined limit, for example should the material become engaged with the end of the member when the pallet 30 is being moved horizontally, the plate 31 will move over and engage the switch arm 58 and thus actuate the switch 60 to de-energize the motor driving the shuttle. The switch lever 58 is spring biased and therefore the shuttle motor is automatically re-energized once the member 31 is moved to a position where it no longer engages the switch lever 58.

This stop mechanism, which is the subject of the present invention, moves translationally since it is mounted on pivots which form a parallelogram, which parallelogram is biased into a rectangular configuration by resilient means located adjacent the pivot points.

Operation of Translationally Movable Stop Mechanism

In the normal operation of the present invention, the material to be stored 62 is placed on a pallet 30 with the pallet or the material engaging the stop 31 in the position as shown in the drawings. In this position the points 44, 46, 50 and 48 form a rectangle. To change this configuration a horizontal force must be exerted on the stop element 31. As the pallet 30 with its material 62 is placed against the element 31 by a force normal to the surface of the element 31, this element forms a solid stop for the material.

Should the pallet or a projecting part of the load 62 engage or rub against the element 31 sufficient to overcome the spring bias exerted to hold the element 31 in the extended position, the member 31 will move in the direction the force is exerted and away from the pallet 30 and its supported load 62. Should this force continue, the member 31 will move until it engages the switch member 58 actuating the switch 60 to de-energize the shuttle drive.

Once the correction is made to move the member 31 out of engagement with the member 58, the shuttle motor is again reenergized and normal operation may proceed.

It may thus be seen that by the present invention, material loads may be properly located on stacker shuttles and should the load shift or should projecting parts of the load subsequently drag against the stop element, the present invention will prevent damage to the material or equipment.

Having thus described the preferred embodiment of the present invention, it will, of course, be understood that various changes may be made in the stacker, the stop mechanism or its configuration, details, arrangements or proportion of parts without departing from the scope of the invention, which consists of the matter shown and described herein and set forth in the appended claims.

I claim:

1. A material handling mechanism including:
 a horizontally extending material transporting support,
 a resiliently biased translationally movable stop mechanism located adjacent said material transporting support and extending parallel to the direction of movement of material on said support including:
 a stop element extending above said material transporting support,
 a rigid supporting member located on the side of said stop element opposite said material transporting support,
 a first rigid link pivotally connected at a pivot point near one end of said link to said stop element and pivotally connected at a pivot point near the other end of said link to said rigid supporting member,
 a second rigid link pivotally connected at a pivot point near one end of said link to said stop element and pivotally connected at a pivot point near the other end of said link to said rigid supporting member,
 said pivot points so located that lines connecting them in sequence form a parallelogram,
 and spring biased means biasing said parallelogram into a rectangle
 in which said material transporting support is capable of transporting said material in two directions of movement parallel to said stop element,
 whereby said stop element is biased the maximum distance from said rigid support member permitted by said rigid links,
 and moves translationally away from said material transporting support when frictionally engaged by the material carried by said support, and including,
 a safety switch capable of stopping the movement of said material transporting support,
 a means for actuating said safety switch when said stop element is moved translationally a predetermined distance away from said material transporting support,
 whereby the movement of said stop element over a predetermined distance stops the movement of said material transporting support.

* * * * *